(12) United States Patent  (10) Patent No.: US 11,086,428 B2
Wang et al.  (45) Date of Patent: Aug. 10, 2021

(54) TOUCH CIRCUIT INCLUDING PRESSURE SENSITIVE CIRCUIT, TOUCH DRIVING METHOD AND TOUCH DISPLAY PANEL

(71) Applicants: BEIJING BOE DISPLAY TECHNOLOGY CO., LTD., Beijing (CN); BOE TECHNOLOGY GROUP CO., LTD., Beijing (CN)

(72) Inventors: Guangxing Wang, Beijing (CN); Dianzheng Dong, Beijing (CN); Qiang Zhang, Beijing (CN); Pengming Chen, Beijing (CN); Wenpeng Xu, Beijing (CN); Kan Zhang, Beijing (CN); Jie Li, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/613,246

(22) PCT Filed: Apr. 19, 2019

(86) PCT No.: PCT/CN2019/083426
§ 371 (c)(1),
(2) Date: Nov. 13, 2019

(87) PCT Pub. No.: WO2019/206034
PCT Pub. Date: Oct. 31, 2019

(65) Prior Publication Data
US 2020/0174606 A1 Jun. 4, 2020

(30) Foreign Application Priority Data
Apr. 24, 2018 (CN) .......................... 201810371986.1

(51) Int. Cl.
*G06F 3/041* (2006.01)
*G06F 3/044* (2006.01)

(52) U.S. Cl.
CPC .......... *G06F 3/0412* (2013.01); *G06F 3/0443* (2019.05); *G06F 3/0446* (2019.05); *G06F 3/04166* (2019.05); *G06F 2203/04105* (2013.01)

(58) Field of Classification Search
CPC .................................................. G06F 3/0412
See application file for complete search history.

(56) References Cited

U.S. PATENT DOCUMENTS

| 5,204,661 A | * | 4/1993 | Hack | ...................... G06F 3/0412 345/88 |
| 2007/0024546 A1 | * | 2/2007 | Jang | ...................... G06K 9/0002 345/78 |

(Continued)

FOREIGN PATENT DOCUMENTS

| CN | 101430467 A | 5/2009 |
| CN | 103150073 A | 6/2013 |

(Continued)

OTHER PUBLICATIONS

First Office Action for Chinese Application No. 201810371986.1, dated Oct. 21, 2019, 6 Pages.

(Continued)

*Primary Examiner* — William Boddie
*Assistant Examiner* — Andrew B Schnirel
(74) *Attorney, Agent, or Firm* — Brooks Kushman P.C.

(57) ABSTRACT

A touch circuit includes a touch circuit, a first energy storage circuit, a second energy storage circuit and a resetting circuit. A first end of the first energy storage circuit is connected to a control end of the touch circuit, and a second end thereof is connected to a first voltage input end. A first (Continued)

end of the second energy storage circuit is connected to a first conductive line, and a second end thereof is connected to the control end of the touch circuit. A first end of the touch circuit is connected to the first conductive line, and a second end thereof is connected to a third conductive line. A control end of the resetting circuit is connected to a second conductive line, a first end thereof is connected to the third conductive line, and a second end thereof is connected to a second voltage input end.

16 Claims, 5 Drawing Sheets

(56) References Cited

U.S. PATENT DOCUMENTS

| | | | |
|---|---|---|---|
| 2009/0115735 A1 | 5/2009 | Chuang | |
| 2009/0160822 A1* | 6/2009 | Eguchi | G06F 3/0445 |
| | | | 345/174 |
| 2010/0079406 A1 | 4/2010 | Chen et al. | |
| 2010/0171724 A1 | 7/2010 | Chang et al. | |
| 2010/0265213 A1 | 10/2010 | Chen et al. | |
| 2011/0310057 A1* | 12/2011 | Wang | G06F 3/0447 |
| | | | 345/174 |
| 2013/0027326 A1 | 1/2013 | Kim et al. | |
| 2014/0184570 A1* | 7/2014 | Ahn | G06F 3/044 |
| | | | 345/175 |
| 2015/0227247 A1* | 8/2015 | Wu | G02F 1/1333 |
| | | | 345/175 |
| 2016/0004364 A1 | 1/2016 | Hu et al. | |
| 2016/0048717 A1* | 2/2016 | Yang | G06K 9/0002 |
| | | | 382/124 |
| 2016/0132713 A1* | 5/2016 | Bae | G06K 9/0014 |
| | | | 345/174 |
| 2016/0154515 A1 | 6/2016 | Mu et al. | |
| 2016/0202790 A1 | 7/2016 | Yang et al. | |
| 2018/0356924 A1* | 12/2018 | Hsieh | G06F 3/0412 |
| 2019/0025965 A1 | 1/2019 | Yang et al. | |
| 2019/0095027 A1 | 3/2019 | Zhang et al. | |

FOREIGN PATENT DOCUMENTS

| | | |
|---|---|---|
| CN | 103500040 A | 1/2014 |
| CN | 104503649 A | 4/2015 |
| CN | 105679251 A | 6/2016 |
| CN | 106155414 A | 11/2016 |
| CN | 108536336 A | 9/2018 |

OTHER PUBLICATIONS

International Search Report and Written Opinion for Application No. PCT/CN2019/083426, dated Jul. 25, 2019, 10 Pages.

* cited by examiner

TOUCH CIRCUIT INCLUDING PRESSURE SENSITIVE CIRCUIT, TOUCH DRIVING METHOD AND TOUCH DISPLAY PANEL

CROSS-REFERENCE TO RELATED APPLICATIONS

This application is the U.S. national phase of PCT Application No. PCT/CN2019/083426 filed on Apr. 19, 2019, which claims priority to Chinese Patent Application No. 201810371986.1 filed on Apr. 24, 2018, which are incorporated herein by reference in their entireties.

TECHNICAL FIELD

The present disclosure relates to the field of touch technology, in particular to a touch circuit, a touch driving method and a touch display panel.

BACKGROUND

For a conventional in-cell touch display panel, it is necessary to provide a separate touch scanning line to perform a touch scanning operation, resulting in a large quantity of lines for a touch circuit and a large difficulty in wiring. In addition, it is impossible for the conventional in-cell touch display panel to achieve a display function and a touch function simultaneously.

SUMMARY

An object of the present disclosure is to provide a touch circuit, a touch driving method and a touch display panel, so as to solve the above-mentioned problems.

In one aspect, the present disclosure provides in some embodiments a touch circuit, including a touch circuit, a first energy storage circuit, a second energy storage circuit and a resetting circuit. A first end of the first energy storage circuit is connected to a control end of the touch circuit, and a second end of the first energy storage circuit is connected to a first voltage input end. A first end of the second energy storage circuit is connected to a first conductive line, and a second end of the second energy storage circuit is connected to the control end of the touch circuit. A first end of the touch circuit is connected to the first conductive line, and a second end of the touch circuit is connected to a third conductive line. The touch circuit is configured to control a voltage value of a voltage signal outputted to the third conductive line under the control of the control end of the touch circuit. A control end of the resetting circuit is connected to a second conductive line, a first end of the resetting circuit is connected to the third conductive line, and a second end of the resetting circuit is connected to a second voltage input end. The resetting circuit is configured to control the third conductive line to be electrically connected to, or electrically disconnected from, the second voltage input end under the control of the second conductive line.

In a possible embodiment of the present disclosure, the touch circuit further includes a pressure sensitive circuit, a first end of which is connected to the control end of the touch circuit, a second end of which is connected to a third voltage input end. The pressure sensitive circuit is configured to enable the control end of the touch circuit to be electrically connected to the third voltage input end when a pressure value of a pressure signal received by the pressure sensitive circuit is greater than a predetermined pressure value, and enable the control end of the touch circuit to be electrically disconnected from the third voltage input end when the pressure value of the pressure signal received by the pressure sensitive circuit is smaller than or equal to the predetermined pressure value.

In a possible embodiment of the present disclosure, the touch circuit further includes a touch sensing circuit connected to the third conductive line, and configured to determine whether a touch electrode block is being touched in accordance with the voltage value of the voltage signal on the third conductive line, and determine whether the pressure value of the pressure signal received by the pressure sensitive circuit is greater than the predetermined pressure value.

In a possible embodiment of the present disclosure, the first conductive line is a first gate line in a row direction, the second conductive line is a second gate line adjacent to the first gate line in a column direction, and the third conductive line is a touch sensing line in the column direction.

In a possible embodiment of the present disclosure, the first voltage input end and the second voltage input end are ground ends, and the third voltage input end is a low voltage input end.

In a possible embodiment of the present disclosure, the touch circuit includes a touch transistor, the first energy storage circuit includes a first capacitor, and the second energy storage circuit includes a second capacitor. A gate electrode of the touch transistor is the control end of the touch circuit, a first electrode of the touch transistor is the first end of the touch circuit, and a second electrode of the touch transistor is the second end of the touch circuit. A first end of the first capacitor is the first end of the first energy storage circuit, and a second end of the first capacitor is the second end of the first energy storage circuit. A first end of the second capacitor is connected to the first conductive line, and a second end of the second capacitor is connected to the gate electrode of the touch transistor. The resetting circuit includes a resetting transistor, a gate electrode of which is the control end of the resetting circuit, a first electrode of which is the first end of the resetting circuit, and a second electrode of which is the second end of the resetting circuit.

In a possible embodiment of the present disclosure, the pressure sensitive circuit includes a pressure sensitive transistor, a gate electrode of which is in a floating state, a first electrode of which is connected to the control end of the touch circuit, and a second electrode of which is connected to the third voltage input end.

In another aspect, the present disclosure provides in some embodiments a touch driving method for the above-mentioned touch circuit, including: at a touch scanning stage, controlling, by a touch circuit, a voltage value of a voltage signal outputted to a third conductive line under the control of a control end of the touch circuit, the voltage value being used to determine whether a touch electrode block connected to the control end of the touch circuit is being touched, and enabling, by a resetting circuit, the third conductive line to be electrically disconnected from a second voltage input end under the control of a second conductive line; and at a resetting stage, enabling, by the resetting circuit, the third conductive line to be electrically connected to the second voltage input end under the control of the second conductive line, so as to reset a voltage across the third conductive line.

In a possible embodiment of the present disclosure, the touch circuit further includes a pressure sensitive circuit. The touch driving method further includes, at the touch scanning stage and the resetting stage, enabling, by the pressure sensitive circuit, the control end of the touch circuit to be electrically connected to a third voltage input end when a pressure value of a pressure signal received by the pressure sensitive circuit is greater than a predetermined pressure value, and enabling, by the pressure sensitive circuit, the control end of the touch circuit to be electrically disconnected from the third voltage input end when the pressure value of the pressure signal received by the touch circuit is smaller than or equal to the predetermined pressure value.

In a possible embodiment of the present disclosure, the touch circuit further includes a touch sensing circuit. The touch driving method further includes, at the touch scanning stage, determining, by the touch sensing circuit, whether the touch electrode block is being touched in accordance with the voltage value of the voltage signal on the third conductive line, and determining whether the pressure value of the pressure signal received by the pressure sensitive circuit is greater than the predetermined pressure value.

In yet another aspect, the present disclosure provides in some embodiments a touch display panel, including: a gate metal layer arranged on a substrate and including a plurality of first conductive lines and a plurality of second conductive lines, the plurality of first conductive lines and the plurality of second conductive lines being arranged alternately; and a touch circuit layer and a touch electrode layer arranged on the gate metal layer, the touch electrode layer including a plurality of touch electrode blocks arranged in rows and columns and separated from each other, the touch circuit layer including a plurality of third conductive lines and a plurality of the above-mentioned touch circuits arranged in rows and columns.

In a possible embodiment of the present disclosure, a second insulation layer is arranged between the touch circuit layer and the gate metal layer, and a first insulation layer is arranged between the touch circuit layer and the touch electrode layer.

In a possible embodiment of the present disclosure, each touch circuit is electrically connected to one of the touch electrode blocks through a first via-hole penetrating through the first insulation layer, and electrically connected to one of the plurality of first conductive lines and one of the plurality of second conductive layers through a second via-hole and a third via-hole penetrating through the second insulation layer respectively.

In a possible embodiment of the present disclosure, the plurality of first conductive lines is a $(2N-1)^{th}$ gate line, the plurality of second conductive lines is a $(2N)^{th}$ gate line, the plurality of third conductive line is a touch sensing line, and the plurality of first conductive line and the plurality of second conductive line are perpendicular to the plurality of third conductive line. Each touch circuit in an $N^{th}$ row in the touch circuit layer is electrically connected to the $(2N-1)^{th}$ gate line and the $(2N)^{th}$ gate line in the gate metal layer through the second via-hole and the third via-hole respectively. Each touch circuit in an $M^{th}$ column in the touch circuit layer is electrically connected to an $M^{th}$ touch sensing line in the touch circuit layer, where N and M are each a positive integer.

In a possible embodiment of the present disclosure, the plurality of touch circuits in the touch circuit layer is arranged at a region corresponding to a non-opening region of the touch display panel.

In a possible embodiment of the present disclosure, a touch circuit in an $A^{th}$ row and a $B^{th}$ column in the touch circuit layer is arranged between a pixel circuit in a $(2A-1)^{th}$ row and a $(2B-1)^{th}$ column and a pixel circuit in the $(2A-1)^{th}$ row and a $(2B)^{th}$ column on the touch display panel, where A and B are each a positive integer.

In a possible embodiment of the present disclosure, an orthogonal projection of the pixel circuit in the $(2A-1)^{th}$ row and the $(2B-1)^{th}$ column onto the substrate, an orthogonal projection of the pixel circuit in the $(2A-1)^{th}$ row and the $(2B)^{th}$ column onto the substrate, an orthogonal projection of the pixel circuit in a $(2A)^{th}$ row and the $(2B-1)^{th}$ column onto the substrate, an orthogonal projection of the pixel circuit in the $(2A)^{th}$ row and the $(2B)^{th}$ column onto the substrate and an orthogonal projection of the pixel circuit in the $A^{th}$ row and the $B^{th}$ column onto the substrate are all located within an orthogonal projection of a touch electrode block in the $A^{th}$ row and the $B^{th}$ column onto the substrate.

DETAILED DESCRIPTION

Figure 1:
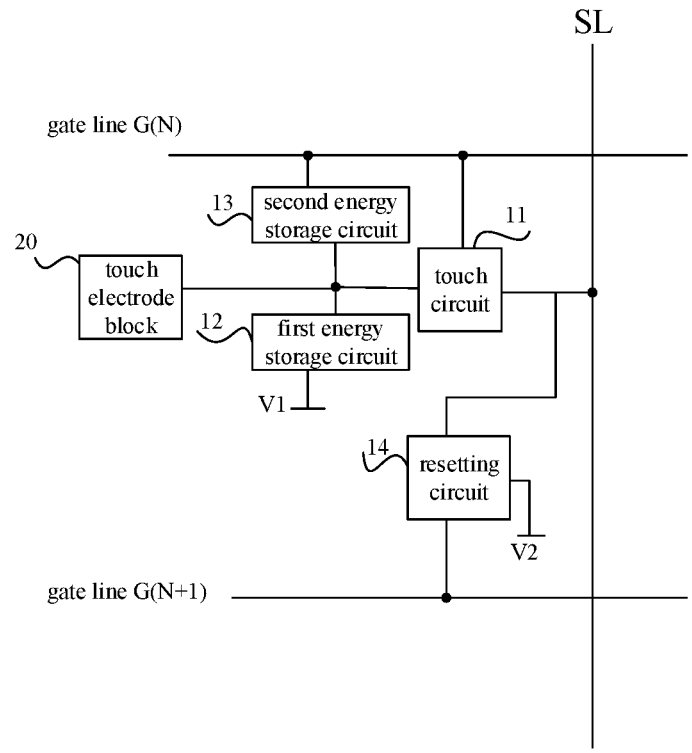
FIG. 1 is a schematic view showing a touch circuit according to one embodiment of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

All transistors adopted in the embodiments of the present disclosure may be thin film transistors (TFTs), field effect transistors (FETs) or any other elements having an identical characteristic. In order to differentiate two electrodes other than a gate electrode from each other, one of the two electrodes is called as first electrode and the other is called as second electrode. In actual use, the first electrode may be a drain electrode while the second electrode may be a source electrode, or the first electrode may be a source electrode while the second electrode may be a drain electrode.

An object of the present disclosure is to solve the problem in the related art where there is a large quantity of lines for a touch circuit and a large difficulty in wiring.

The present disclosure provides in some embodiments a touch circuit connected to a touch electrode block 20 of a touch display panel. Although the touch electrode block 20 seems to be located at a same plane as the touch circuit in the drawings, it should be appreciated that, in actual use the touch electrode block 20 may be arranged at different layers from the touch circuit.

As shown in FIG. 1, the touch circuit includes a touch circuit 11, a first energy storage circuit 12, a second energy storage circuit 13 and a resetting circuit 14.

The touch electrode block 20 is electrically connected to a control end of the touch circuit 11. A first end of the first energy storage circuit 12 is connected to the control end of the touch circuit 11, and a second end of the first energy storage circuit 12 is connected to a first voltage input end. The first voltage input end is configured to input a first voltage V1. The control end of the touch circuit 11 is further connected to a corresponding gate line G(N) via the second energy storage circuit 13, a first end of the touch circuit 11 is connected to the corresponding gate line G(N), and a second end of the touch circuit 11 is connected to a corresponding touch sensing line SL. The touch circuit 11 is configured to control a voltage value of a voltage signal outputted to the corresponding touch sensing line SL under the control of the control end of the touch circuit 11.

A control end of the resetting circuit 14 is connected to a next gate line G(N+1), a first end of the resetting circuit 14 is connected to the corresponding touch sensing line SL, and a second end of the resetting circuit 14 is connected to a second voltage input end. The second voltage input end is configured to input a second voltage V2. The resetting circuit 14 is configured to enable the corresponding touch sensing line SL to be electrically connected to, or electrically disconnected from, the second voltage input end under the control of the next gate line G(N+1). The next gate line is a next gate line adjacent to the corresponding gate line in a column direction.

During the implementation, the first voltage input end may be, but not limited to, a ground end or a low voltage input end, and the second voltage input end may be, but not limited to, a ground end or a low voltage input end.

According to the touch circuit in the embodiments of the present disclosure, the corresponding gate line G(N) may be reused as a touch scanning line, and the next gate line G(N+1) may be reused as a touch resetting line, so as to reduce the quantity of lines for a touch function as well as the difficulty in the wiring.

In addition, when the touch circuit is applied to the touch display panel, it is unnecessary to reuse any common electrode block as the touch electrode block 20. Instead, a separate touch electrode layer including the touch electrode blocks 20 may be provided, and the touch electrode blocks 20 may be arranged in rows and columns and separated from each other. As a result, it is able to detect a touch operation within a display time period, thereby to reduce a scanning frequency of a touch Integrated Circuit (IC) without reusing the common electrode block in a time-division manner, and remarkably increase a touch detection time.

During the operation, each display period of the touch circuit in FIG. 1 may include a touch scanning stage and a resetting stage.

At the touch scanning stage, the touch circuit 11 may control the voltage value of the voltage signal outputted to the corresponding touch sensing line SL under the control of the control end of the touch circuit 11, and determine whether the touch electrode block 20 connected to the control end of the touch circuit 11 is being touched in accordance with the voltage value. The resetting circuit 14 may control the corresponding touch sensing line SL to be electrically disconnected from the second voltage input end under the control of the next gate line G(N+1).

At the resetting stage, the resetting circuit 14 may control the corresponding touch sensing line SL to be electrically connected to the second voltage input end under the control of the next gate line G(N+1), so as to reset a voltage across the corresponding touch sensing line SL.

For the touch circuit in the embodiments of the present disclosure, the touch electrode block 20 may be electrically connected to the control end of the touch circuit 11. When the touch electrode block 20 is being touched, a coupling capacitor may be formed between a finger and the touch electrode block 20, and this coupling capacitor may be connected in parallel to the first energy storage circuit 12. When the touch electrode is being touched, a capacitance of the coupling capacitor may be positive, and when the touch electrode is not being touched, the capacitance of the coupling capacitor may approach to 0. The voltage value of the voltage signal outputted by the touch circuit 11 to the corresponding touch sensing line SL at the touch scanning stage may be affected by the capacitance of the coupling capacitor, so whether the touch electrode block is being touched may be determined through detecting the voltage value.

Figure 2:
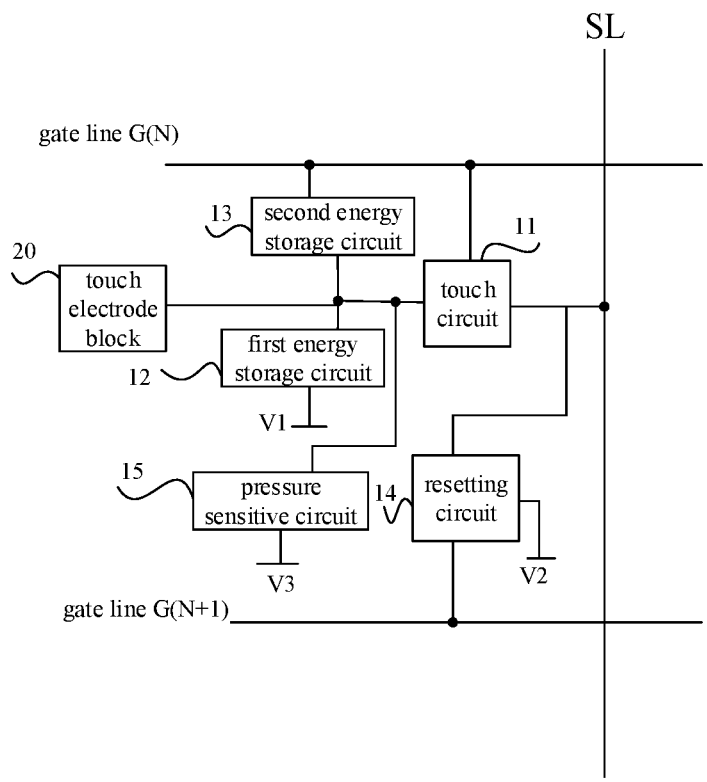
FIG. 2 is another schematic view showing the touch circuit according to one embodiment of the present disclosure.

In a possible embodiment of the present disclosure, as shown in FIG. 2, the touch circuit may further include a pressure sensitive circuit 15 connected to the control end of the touch circuit 11 and a third voltage input end configured to input a third voltage V3. The pressure sensitive circuit 15 is configured to enable the control end of the touch circuit 11 to be electrically connected to the third voltage input end when a pressure value of a pressure signal received by the pressure sensitive circuit is greater than a predetermined pressure value, and enable the control end of the touch circuit 11 to be electrically disconnected from the third voltage input end when the pressure value of the pressure signal received by the pressure sensitive circuit is smaller than or equal to the predetermined pressure value.

During the implementation, the predetermined pressure value may be set according to the practical need.

In FIG. 2, through the additional pressure sensitive circuit 15, it is able to determine whether the pressure value of the pressure signal applied to the pressure sensitive circuit 15 is greater than the predetermined pressure value in accordance with the voltage value of the voltage signal outputted by the touch circuit 11 to the corresponding touch sensing line SL at the touch scanning stage.

During the implementation, the third voltage input end may be, but not limited to, a low voltage input end or a ground end.

During the operation of the touch circuit in FIG. 2, when the pressure value of the pressure signal received by the pressure sensitive circuit 15 is greater than the predetermined pressure value, the pressure sensitive circuit 15 may control the control end of the touch circuit 11 to be electrically connected to the third voltage input end, and the touch circuit 11 may control the corresponding touch sensing line SL to be electrically disconnected from the corresponding gate line G(N) and control the voltage value of the voltage signal outputted to the corresponding touch sensing line SL to approach to 0.

According to the touch circuit in FIG. 2, it is able to detect a pressure while detecting a touch operation, i.e., to distinguish a touch detection operation from a pressure detection operation.

Figure 3:
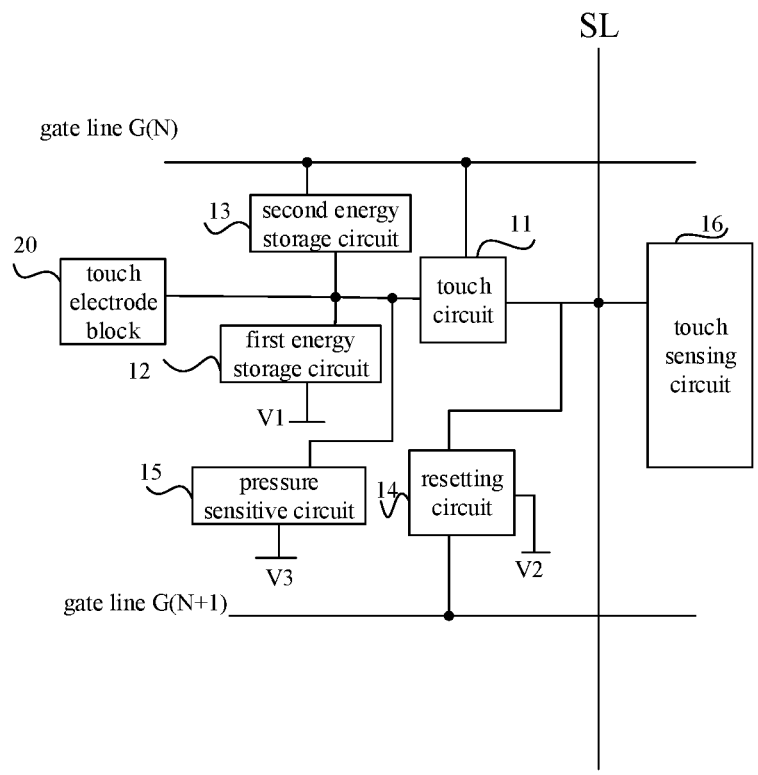
FIG. 3 is yet another schematic view showing the touch circuit according to one embodiment of the present disclosure.

During the implementation, on the basis of the touch circuit in FIG. 2, as shown in FIG. 3, the touch circuit may further include a touch sensing circuit 16 connected to the corresponding touch sensing line SL, and configured to determine whether the touch electrode block 20 is being touched in accordance with the voltage value of the voltage signal on the corresponding touch sensing line SL and determine whether the pressure value of the pressure signal received by the pressure sensitive circuit 15 is greater than the predetermined pressure value.

In actual use, the touch sensing circuit 16 may determine whether the touch electrode block 20 is being touched in accordance with the voltage value of the voltage signal on the touch sensing line SL at the touch scanning stage, and determine whether the pressure value of the pressure signal received by the pressure sensitive circuit 15 is greater than the predetermined pressure value.

The touch sensing circuit 16 may be of any circuit structure capable of detecting the voltage signal on the corresponding touch sensing line SL and then determining whether the pressure value is greater than the predetermined pressure value in accordance with the voltage signal.

To be specific, the touch circuit may include a touch transistor, the first energy storage circuit may include a first capacitor, and the second energy storage circuit may include a second capacitor. A gate electrode of the touch transistor may be the control end of the touch circuit, a first electrode of the touch transistor may be the first end of the touch circuit, and a second electrode of the touch transistor may be the second end of the touch circuit.

A first end of the first capacitor may be the first end of the first energy storage circuit, and a second end of the first capacitor may be the second end of the first energy storage circuit. A first end of the second capacitor may be connected to the corresponding gate line, and a second end of the second capacitor may be connected to the gate electrode of the touch transistor.

The resetting circuit may include a resetting transistor, a gate electrode of which is the control end of the resetting circuit, a first electrode of which is the first end of the resetting circuit, and a second electrode of which is the second end of the resetting circuit.

To be specific, the pressure sensitive circuit may include a pressure sensitive transistor, a gate electrode of which is in a floating state, a first electrode of which is connected to the control end of the touch circuit, and a second electrode of which is connected to the third voltage input end. The pressure sensitive transistor may be a transistor in which a function of a pressure sensor is integrated. When the pressure value of the pressure signal received by the pressure sensitive transistor is greater than the predetermined pressure value, the pressure sensitive transistor may be turned on, so that the first electrode of the pressure sensitive transistor may be electrically connected to the second electrode of the pressure sensitive transistor. When the pressure value of the pressure signal received by the pressure sensitive transistor is smaller than or equal to the predetermined pressure value, the pressure sensitive transistor may be turned off, so that the first electrode of the pressure sensitive transistor may be electrically disconnected from the second electrode of the pressure sensitive transistor. In actual use, the pressure sensitive transistor may also be a pressure sensitive dual-gate transistor.

The touch circuit will be described hereinafter in more details in conjunction with a specific embodiment.

Figure 4:
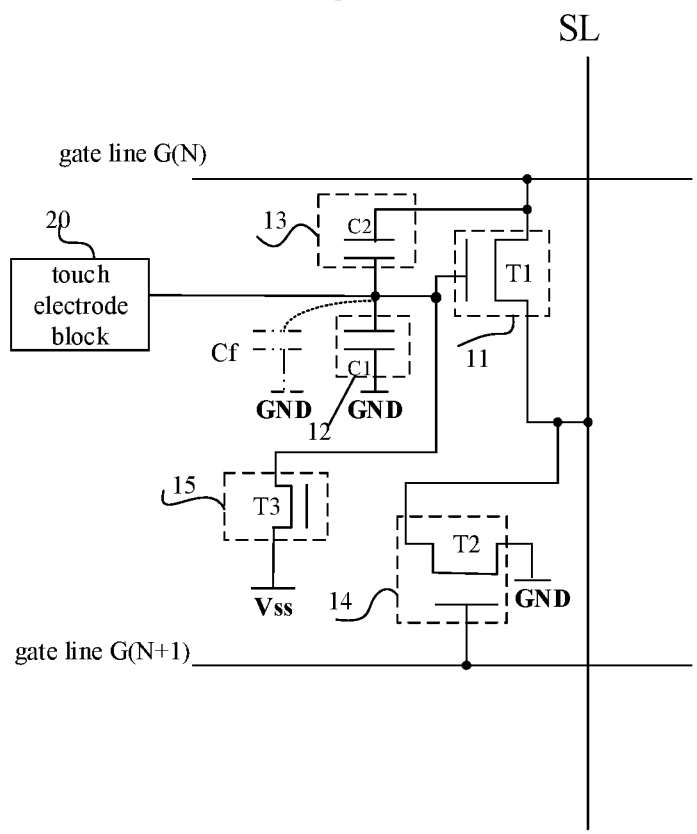
FIG. 4 is a circuit diagram of the touch circuit according to one embodiment of the present disclosure.

As shown in FIG. 4, the touch circuit may include the touch circuit 11, the first energy storage circuit 12, the second energy storage circuit 13, the resetting circuit 14 and the pressure sensitive circuit 15. The touch circuit 11 may include a touch transistor T1, the first energy storage circuit 12 may include a first capacitor C1, and the second energy storage circuit 13 may include a second capacitor C2.

A gate electrode of the touch transistor T1 may be the control end of the touch circuit 11, a drain electrode thereof may be the first end of the touch circuit 11, and a source electrode thereof may be the second end of the touch circuit 11. A first end of the first capacitor C1 may be the first end of the first energy storage circuit 12, and the second end thereof may be the second end of the first energy storage circuit 12.

A first end of the second capacitor C2 may be connected to the corresponding gate line G(N), and a second end thereof may be connected to the gate electrode of the touch transistor T1. The resetting circuit 14 may include a resetting transistor T2, a gate electrode of which is the control end of the resetting circuit 14, a drain electrode of which is the first end of the resetting circuit 14, and a source electrode of which is the second end of the resetting circuit 14.

The touch electrode block 20 may be electrically connected to the gate electrode of the touch transistor T1. The first end of the first capacitor C1 may be connected to the gate electrode of the touch transistor T1, and the second end of the first capacitor C1 may be connected to the first voltage input end. In this embodiment, the first voltage input end may be a ground end GND.

The gate electrode of the touch transistor T1 may be further connected to the corresponding gate line G(N) via the second capacitor C2, the drain electrode of the touch transistor T1 may be connected to the corresponding gate line G(N), and the source electrode of the touch transistor T1 may be connected to the corresponding touch sensing line SL.

The gate electrode of the resetting transistor T2 may be connected to the next gate line G(N+1), the drain electrode thereof may be connected to the corresponding touch sensing line SL, and the source electrode thereof may be connected to the second voltage input end. In this embodiment, the second voltage input end may be a ground end GND. The next gate line G(N+1) may be a next gate line adjacent to the corresponding gate line G(N) in a column direction.

The pressure sensitive circuit 15 may include a pressure sensitive transistor T3, a gate electrode of which is in a floating state, a drain electrode of which is connected to the gate electrode of the touch transistor T1, and a source electrode of which is connected to the third voltage input end. In this embodiment, the third voltage input end may be a low voltage input end for inputting a low voltage Vss.

The pressure sensitive transistor T3 may control the gate electrode of the touch transistor T1 to be electrically connected to the low voltage input end Vss when the pressure value of the pressure signal received by the pressure sensitive transistor T3 is greater than the predetermined pressure value, and control the gate electrode of the touch transistor T1 to be electrically disconnected from the low voltage input end when the pressure value of the pressure signal received by the pressure sensitive transistor T3 is smaller than or equal to the predetermined pressure value.

In FIG. 4, T1 and T2 are both n-type transistors. However, in actual use, in the case that the gate line of a display panel is enabled when a gate driving signal outputted by the gate line is at a low level, T1 and T2 may also be p-type transistors.

For the touch circuit in FIG. 4, G(N) may be reused as a touch scanning line, and G(N+1) may be reused as a touch resetting line.

During the operation of the touch circuit in FIG. 4, each display time period may include the touch scanning stage and the resetting stage.

At the touch scanning stage, G(N) may output a high level, and G(N+1) may output a low level, so as to turn on T1 to charge C1 and C2, and turn off T2. In FIG. 4, Cf represents a coupling capacitor formed between the finger and the touch electrode block when a touch operation is being made, and Cf is connected in parallel to C1. When the touch electrode block 20 is being touched, a capacitance of Cf may be positive, and when the touch electrode block 20 is not being touched, the capacitance of Cf may approach to 0 (Cf may not exist when no touch operation is made).

At the touch scanning stage, when the touch electrode block is being touched, the capacitance of Cf may be greater than 0. At this time, an IR drop at the source electrode and the drain electrode of T1 may increase, and the voltage signal outputted by T1 through its source electrode to the corresponding touch sensing line SL may have a relatively low voltage value. Finally, the voltage value of the voltage signal outputted to SL may be relatively small but greater than 0.

At the touch scanning phase, when the touch electrode block is not being touched, the capacitance of Cf may be equal to 0. At this time, the IR drop at the source electrode and the drain electrode of T1 may be relatively small, and the voltage signal outputted by T1 through its source electrode to the corresponding touch sensing line SL may have a relatively high voltage value. Finally, the voltage value of the voltage signal outputted to SL may be relatively large.

At the touch scanning stage, when the pressure value of the pressure signal received by the pressure sensitive circuit 15 is greater than the predetermined pressure value, i.e., when a sufficiently large pressure is applied to the pressure sensitive circuit 15, the pressure sensitive circuit 15 may control the gate electrode of T1 to be electrically connected to the low voltage input end, so as to apply the low voltage Vss to the gate electrode of T1 and turn off T1, thereby to enable the voltage across the corresponding touch sensing line SL to approach to 0V.

At the touch scanning stage, whether the touch electrode block 20 is being touched and whether the pressure value of the pressure signal received by the pressure sensitive circuit 15 is sufficient large may be determined in accordance with the voltage across the corresponding touch sensing line SL.

At the resetting stage, G(N) may output a low level, and G(N+1) may output a high level, so as to turn off T1 and turn on T2, thereby to reset the voltage across the corresponding touch sensing line SL to be 0.

In the touch circuit in FIG. 4, G(N) may take charge of turning on T1, so it may serve as an on-state voltage source. G(N+1) may reset the voltage across the touch sensing line SL.

According to the touch circuit in FIG. 4, it is able to accurately determine whether there is a touch operation and, if yes, whether a heavy pressure is applied in accordance with the voltage across SL when G(N) is enabled.

Figure 5:
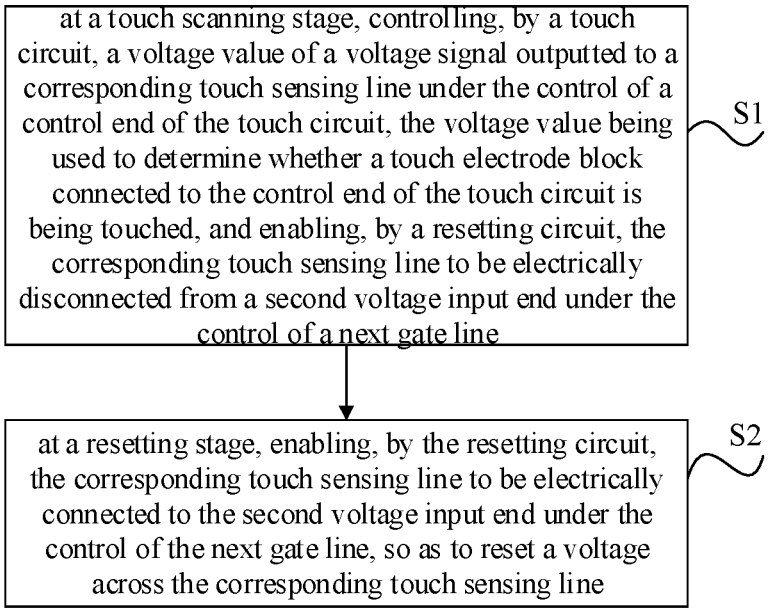
FIG. 5 is a flow chart of a touch driving method according to one embodiment of the present disclosure.

The present disclosure further provides in some embodiments a touch driving method for the above-mentioned touch circuit which, as shown in FIG. 5, includes: Step S1 of, at a touch scanning stage, controlling, by a touch circuit, a voltage value of a voltage signal outputted to a corresponding touch sensing line under the control of a control end of the touch circuit, the voltage value being used to determine whether a touch electrode block connected to the control end of the touch circuit is being touched, and enabling, by a resetting circuit, the corresponding touch sensing line to be electrically disconnected from a second voltage input end under the control of a next gate line; and Step S2 of, at a resetting stage, enabling, by the resetting circuit, the corresponding touch sensing line to be electrically connected to the second voltage input end under the control of the next gate line, so as to reset a voltage across the corresponding touch sensing line.

According to the touch driving method in the embodiments of the present disclosure, the corresponding gate line may be reused as a touch scanning line, and the next gate line may be reused as a touch resetting line, so as to reduce the quantity of lines for a touch function as well as the difficulty in the wiring.

In addition, when the touch driving method is applied to a touch display panel, it is unnecessary to reuse any common electrode block as the touch electrode block. Instead, a separate touch electrode layer including the touch electrode blocks may be provided, and the touch electrode blocks may be arranged in rows and columns and separated from each other. As a result, it is able to detect a touch operation within a display time period, thereby to reduce a scanning frequency of a touch IC without reusing the common electrode block in a time-division manner, and remarkably increase a touch detection time.

In a possible embodiment of the present disclosure, the touch circuit may further include a pressure sensitive circuit. The touch driving method may further include, at the touch scanning stage and the resetting stage, enabling, by the pressure sensitive circuit, the control end of the touch circuit to be electrically connected to a third voltage input end when a pressure value of a pressure signal received by the pressure sensitive circuit is greater than a predetermined pressure value, enabling, by the pressure sensitive circuit, the control end of the touch circuit to be electrically disconnected from the third voltage input end when the pressure value of the pressure signal received by the touch circuit is smaller than or equal to the predetermined pressure value, and determining whether the pressure value of the pressure signal received by the pressure sensitive circuit is greater than the predetermined pressure value in accordance with the voltage value of the voltage signal on the corresponding touch sensing line at the touch scanning stage.

When the touch circuit further includes the pressure sensitive circuit, it is able for the touch driving method to detect a pressure while detecting a touch operation, i.e., to distinguish a touch detection operation from a pressure detection operation.

To be specific, the touch circuit may further include a touch sensing circuit. The touch driving method may further include, at the touch scanning stage, determining, by the touch sensing circuit, whether the touch electrode block is being touched in accordance with the voltage value of the voltage signal on the corresponding touch sensing line, and determining whether the pressure value of the pressure signal received by the pressure sensitive circuit is greater than the predetermined pressure value.

Figure 8:
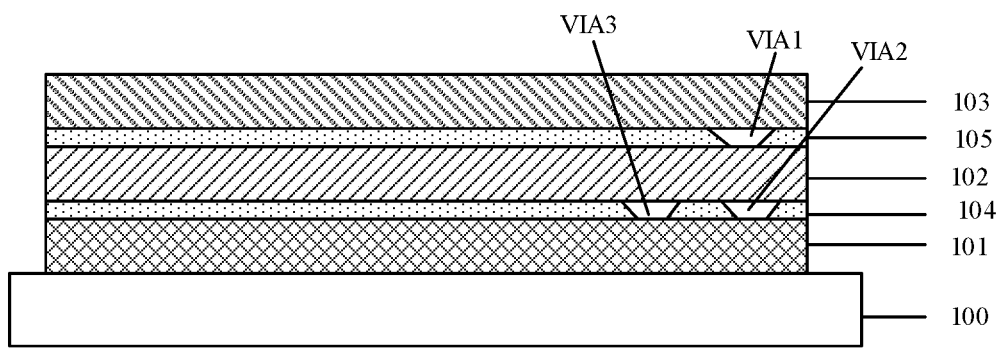
FIG. 8 is a schematic view showing the touch display panel according to one embodiment of the present disclosure.

The present disclosure further provides in some embodiments a touch display panel which, as shown in FIG. 8, includes: a gate metal layer 101 arranged on a substrate 100 and including a plurality of gate lines; and a touch circuit layer 102 and a touch electrode layer 103 arranged on the substrate. A second insulation layer 104 is arranged between the touch circuit layer 102 and the gate metal layer 101, and a first insulation layer 105 is arranged between the touch circuit layer 102 and the touch electrode layer 103. The touch electrode layer 103 includes a plurality of touch electrode blocks 20 arranged in rows and columns, i.e., in a matrix form, and separated from each other. The touch circuit layer 102 includes a plurality of touch sensing lines SL and a plurality of the above-mentioned touch circuits arranged in rows and columns. Each touch circuit is electrically connected to one of the touch electrode blocks 20 through a first via-hole VIA1 penetrating through the first insulation layer 105. Each touch circuit in an $N^{th}$ row in the touch circuit layer 102 is electrically connected to a $(2N-1)^{th}$ gate line and a $(2N)^{th}$ gate line in the gate metal layer 101 through a second via-hole VIA2 and a third via-hole VIA3 penetrating through the second insulation layer 104 respectively. Each touch circuit in an $M^{th}$ column in the touch circuit layer 102 are connected to an $M^{th}$ touch sensing line in the touch circuit layer 102. The plurality of touch circuits in the touch circuit layer 102 is arranged at a region corresponding to a non-opening region of the touch display panel. N and M are each a positive integer.

In the embodiments of the present disclosure, the touch electrode blocks may be arranged at a layer different from the touch circuits. The touch display panel may include the touch electrode layer and the touch circuit layer arranged on the substrate. The touch electrode layer may include the plurality of touch electrode blocks arranged in rows and columns and separated from each other. The touch circuit layer may include the plurality of touch sensing lines and the plurality of touch circuits arranged in rows and columns. Each touch electrode block may correspond to one of the touch circuits, and may be electrically connected to a control end of a touch circuit of the touch circuit through a via-hole. In addition, the touch display panel may further include the gate metal layer arranged on the substrate. The gate metal layer may include the plurality of gate lines. The $(2N-1)^{th}$ gate line and the $(2N)^{th}$ gate line in the gate metal layer may be connected to the touch circuits in the $N^{th}$ row in the touch circuit layer, and the touch circuits in the $M^{th}$ column may be connected to the $M^{th}$ touch sensing line in the touch circuit layer, where M and N are each a positive integer.

In some embodiments of the present disclosure, each touch electrode block may be made of a transparent conductive material, and the touch circuits may be arranged at a region corresponding to the non-opening region of the touch display panel, so as to prevent a display function from being adversely affected.

To be specific, a touch circuit in an $A^{th}$ row and a $B^{th}$ column in the touch circuit layer may be arranged between a pixel circuit in a $(2A-1)^{th}$ row and a $(2B-1)^{th}$ column and a pixel circuit in the $(2A-1)^{th}$ row and a $(2B)^{th}$ column on the touch display panel, where A and B are each a positive integer.

In actual use, an orthogonal projection of the pixel circuit in the $(2A-1)^{th}$ row and the $(2B-1)^{th}$ column onto the substrate, an orthogonal projection of the pixel circuit in the $(2A-1)^{th}$ row and the $(2B)^{th}$ column onto the substrate, an orthogonal projection of the pixel circuit in a $(2A)^{th}$ row and the $(2B-1)^{th}$ column onto the substrate, an orthogonal projection of the pixel circuit in the $(2A)^{th}$ row and the $(2B)^{th}$ column onto the substrate and an orthogonal projection of the pixel circuit in the $A^{th}$ row and the $B^{th}$ column onto the substrate may all be located within an orthogonal projection of a touch electrode block in the $A^{th}$ row and the $B^{th}$ column onto the substrate. The above description merely illustratively shows the arrangement mode of the touch electrode blocks. In actual use, any other arrangement mode of the touch electrode blocks may be selected according to the practical need.

Figure 6:
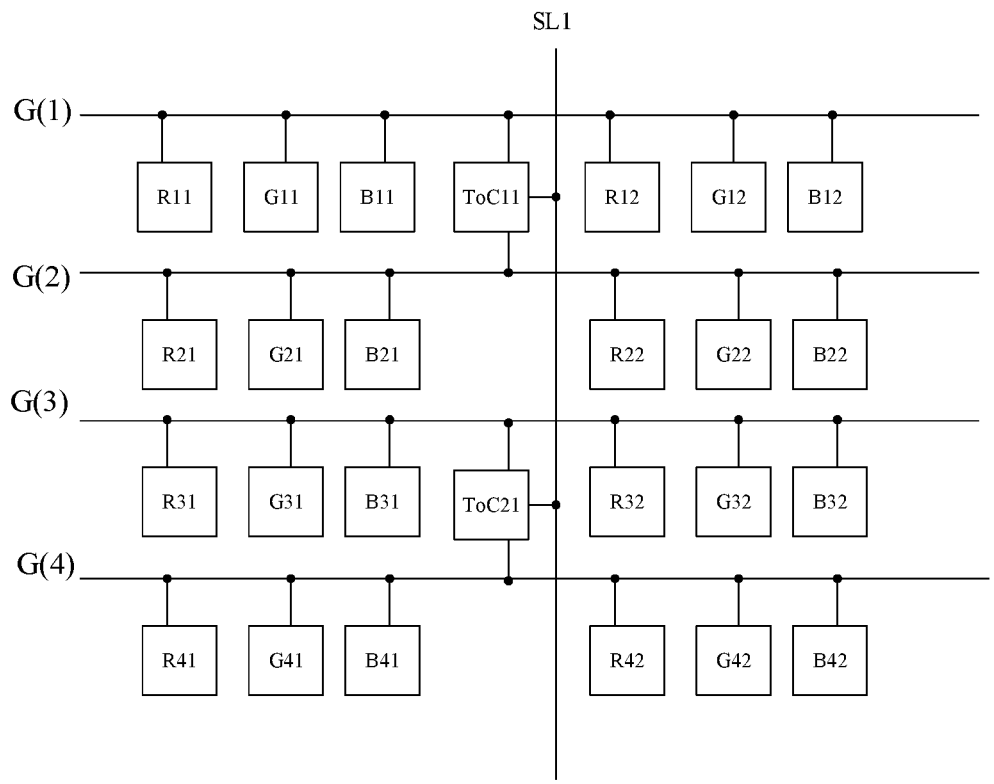
FIG. 6 is a schematic view showing a position relationship between pixel circuits and touch circuits in a touch display panel according to one embodiment of the present disclosure.

As shown in FIG. 6, a pixel circuit in a first row and a first column on the touch display panel includes a red subpixel circuit R11 in the first row and the first column, a red subpixel circuit G11 in the first row and the first column, and a blue subpixel circuit B11 in the first row and the first column. A pixel circuit in the first row and a second column on the touch display panel includes a red subpixel circuit R12 in the first row and the second column, a green subpixel circuit G12 in the first row and the second column, and a blue subpixel circuit B12 in the first row and the second column. A pixel circuit in a second row and the first column on the touch display panel includes a red subpixel circuit R21 in the second row and the first column, a green subpixel circuit G21 in the second row and the first column, and a blue subpixel circuit B21 in the second row and the first column. A pixel circuit in the second row and the second column on the touch display panel includes a red subpixel circuit R22 in the second row and the second column, a green subpixel circuit G22 in the second row and the second column, and a blue subpixel circuit B22 in the second row and the second column. A pixel circuit in a third row and the first column on the touch display panel includes a red subpixel circuit R31 in the third row and the first column, a green subpixel circuit G31 in the third row and the first column, and a blue subpixel circuit B31 in the third row and the first column. A pixel circuit in the third row and the second column on the touch display panel includes a red subpixel circuit R32 in the third row and the second column, a green subpixel circuit G32 in the third row and the second column, and a blue subpixel circuit B32 in the third row and the second column. A pixel circuit in a fourth row and the first column on the touch display panel includes a red subpixel circuit R41 in the fourth row and the first column, a green subpixel circuit G41 in the fourth row and the first column, and a blue subpixel circuit B41 in the fourth row and the first column. A pixel circuit in the fourth row and the second column on the touch display panel includes a red subpixel circuit R42 in the fourth row and the second column, a green subpixel circuit G42 in the fourth row and the second column, and a blue subpixel circuit B42 in the fourth row and the second column.

R11, G11, B11, R12, G12 and B12 are connected to a first gate line Gate(1), R21, G21, B21, R22, G22 and B22 are connected to a second gate line Gate(2), R31, G31, B31, R32, G32 and B32 are connected to a third gate line Gate(3), and R41, G41, B41, R42, G42 and B42 are connected to a fourth gate line Gate(4).

A touch circuit ToC 11 in a first row and a first column in the touch circuit layer is arranged between a pixel circuit in a first row and a first column and a pixel circuit in the first row and a second column on the touch display panel, and connected to Gate(1) and Gate(2). Gate(1) is used for a touch scanning operation, and Gate(2) is used for a touch resetting operation.

A touch circuit ToC 21 in a second row and the first column in the touch circuit layer is arranged between a pixel circuit in a third row and the first column and a pixel circuit in the third row and the second column on the touch display panel, and connected to Gate(3) and Gate(4). Gate(3) is used for a touch scanning operation, and Gate(4) is used for a touch resetting operation.

In FIG. 6, SL1 represents a first touch sensing line. ToC 11 and ToC21 are each further connected to SL. In addition, no touch electrode layer is shown in FIG. 6.

Figure 7:
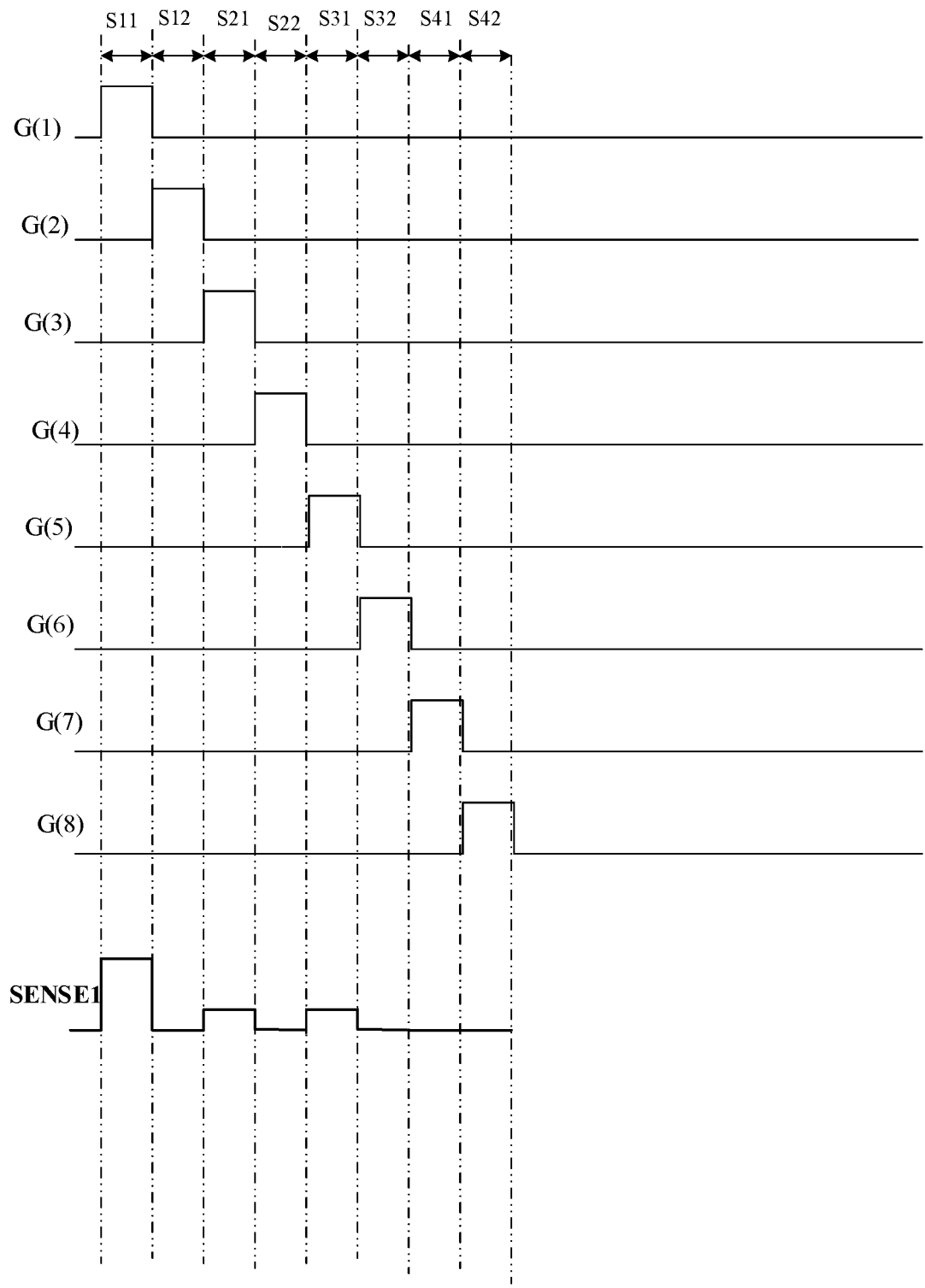
FIG. 7 is a time sequence diagram of gate driving signals on eight gate lines and a voltage signal on a touch sensing line in the touch display panel according to one embodiment of the present disclosure.

In FIG. 7, G(1) represents a first gate driving signal outputted by a first gate line, G(2) represents a second gate driving signal outputted by a second gate line, G(3) represents a third gate driving signal outputted by a third gate line, G(4) represents a fourth gate driving signal outputted by a fourth gate line, G(5) represents a fifth gate driving signal outputted by a fifth gate line, G(6) represents a sixth gate driving signal outputted by a sixth gate line, G(7) represents a seventh gate driving signal outputted by a seventh gate line, G(8) represents an eighth gate driving signal outputted by an eighth gate line, and SENSE1 represents a first touch sensing voltage signal on the first touch sensing line SL1.

At a first touch scanning stage S11, G(1) is at a high level and G(2) is at a low level, while at a first resetting stage S12, G(1) is at a low level and G(2) is at a high level.

At a second touch scanning stage S21, G(3) is at a high level and G(4) is at a low level, while at a second resetting stage S22, G(3) is at a low level and G(4) is at a high level.

At a third touch scanning stage S31, G(5) is at a high level and G(6) is at a low level, while at a third resetting stage S32, G(5) is at a low level and G(6) is at a high level.

At a fourth touch scanning stage S41, G(7) is at a high level and G(8) is at a low level, while at a fourth resetting stage S42, G(7) is at a low level and G(8) is at a high level.

In actual use, at S11, a touch transistor of a touch circuit of the touch circuit in the first row and the first column in the touch circuit layer may be turned on, so as to output a voltage to the first touch sensing line SL1. Hence, at S11, it is able to determine whether a touch electrode block connected to a gate electrode of the touch transistor is being touched in accordance with a voltage value of the first touch sensing voltage signal SENSE1 on SL1. As shown in FIG. 7, at S11, SENSE1 has a relatively large voltage value, so it may be determined that the touch electrode block is currently not being touched.

At S12, a resetting transistor of a resetting circuit of a touch circuit in the first row and the first column in the touch circuit layer may be turned on, so as to reset a voltage across SL1.

At S21, a touch transistor of a touch circuit of a touch circuit in the second row and the first column in the touch circuit layer may be turned on, so as to output a voltage to the first touch sensing line SL1. Hence, at S21, it is able to determine whether a touch electrode block connected to a gate electrode of the touch transistor is being touched in accordance with the voltage value of the first touch sensing voltage signal SENSE1 on SL1. As shown in FIG. 7, at S21, the voltage value of SENSE1 is relatively small but does not approach to 0, so it may be determined that the touch electrode block is currently being touched.

At S22, a resetting transistor of a resetting circuit of a touch circuit in the second row and the first column in the touch circuit layer may be turned on, so as to reset the voltage across SL1.

At S31, a touch transistor of a touch circuit of a touch circuit in the third row and the first column in the touch circuit layer may be turned on, so as to output a voltage to the first touch sensing line SL1. Hence, at S31, it is able to determine whether a touch electrode block connected to a gate electrode of the touch transistor is being touched in accordance with the voltage value of the first touch sensing voltage signal SENSE1 on SL1. As shown in FIG. 7, at S31, the voltage value of SENSE1 is relatively small but does not approach to 0, so it may be determined that the touch electrode block is currently being touched.

At S32, a resetting transistor of a resetting circuit of a touch circuit in the third row and the first column in the touch circuit layer may be turned on, so as to reset the voltage across SL1.

At S41, a touch transistor of a touch circuit of a touch circuit in the fourth row and the first column in the touch circuit layer may be turned on, so as to output a voltage to the first touch sensing line SL1. Hence, at S41, it is able to determine whether a touch electrode block connected to a gate electrode of the touch transistor is being touched in accordance with the voltage value of the first touch sensing voltage signal SENSE1 on SL1. As shown in FIG. 7, at S41, the voltage value of SENSE1 approaches to 0, so it may be determined that the pressure sensitive circuit of the touch circuit is being pressed and the pressure value of the pressure signal received by the pressure sensitive circuit is greater than the predetermined pressure value.

At S42, a resetting transistor of a resetting circuit of a touch circuit in the fourth row and the first column in the touch circuit layer may be turned on, so as to reset the voltage across SL1.

According to the touch circuit and the touch driving method in the embodiments of the present disclosure, as compared with the related art, the corresponding gate line may be reused as the touch scanning line, and the next gate line may be reused as the touch resetting line, so it is able to reduce the quantity of lines for the touch function as well as the difficulty in the wiring. In addition, it is able to detect the touch operation within the display time period, thereby to reduce the scanning frequency of the touch IC without reusing the common electrode block in a time-division manner, and remarkably increase the touch detection time.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A touch circuit, comprising a touch sub-circuit, a first energy storage circuit, a second energy storage circuit, a resetting circuit, and a pressure sensitive circuit, wherein
   a first end of the first energy storage circuit is connected to a control end of the touch sub-circuit, and a second end of the first energy storage circuit is connected to a first voltage input end;
   a first end of the second energy storage circuit is connected to a first conductive line, and a second end of the second energy storage circuit is connected to the control end of the touch sub-circuit;
   a first end of the touch sub-circuit is connected to the first conductive line, and a second end of the touch sub-circuit is connected to a third conductive line;
   the touch sub-circuit is configured to control a voltage value of a voltage signal outputted to the third conductive line under the control of the control end of the touch sub-circuit;
   a control end of the resetting circuit is connected to a second conductive line, a first end of the resetting circuit is connected to the third conductive line, and a second end of the resetting circuit is connected to a second voltage input end; and
   the resetting circuit is configured to control the third conductive line to be electrically connected to, or electrically disconnected from, the second voltage input end under the control of the second conductive line,
   a first end of the pressure sensitive circuit is connected to the control end of the touch sub-circuit, a second end of the pressure sensitive circuit is connected to a third voltage input end, wherein the pressure sensitive circuit is configured to enable the control end of the touch sub-circuit to be electrically connected to the third voltage input end when a pressure value of a pressure signal received by the pressure sensitive circuit is greater than a predetermined pressure value, and enable the control end of the touch sub-circuit to be electrically disconnected from the third voltage input end when the pressure value of the pressure signal received by the pressure sensitive circuit is smaller than or equal to the predetermined pressure value.

2. The touch circuit according to claim 1, further comprising a touch sensing circuit connected to the third conductive line, and configured to determine whether a touch electrode block is being touched in accordance with the voltage value of the voltage signal on the third conductive line, and determine whether the pressure value of the pressure signal received by the pressure sensitive circuit is greater than the predetermined pressure value.

3. The touch circuit according to claim 1, wherein the first conductive line is a first gate line in a row direction, the second conductive line is a second gate line adjacent to the first gate line in a column direction, and the third conductive line is a touch sensing line in the column direction.

4. The touch circuit according to claim 1, wherein the first voltage input end and the second voltage input end are ground ends, and the third voltage input end is a low voltage input end.

5. The touch circuit according to claim 1, wherein the touch sub-circuit comprises a touch transistor, the first energy storage circuit comprises a first capacitor, and the second energy storage circuit comprises a second capacitor;
a gate electrode of the touch transistor is the control end of the touch sub-circuit, a first electrode of the touch transistor is the first end of the touch sub-circuit, and a second electrode of the touch transistor is the second end of the touch sub-circuit;
a first end of the first capacitor is the first end of the first energy storage circuit, and a second end of the first capacitor is the second end of the first energy storage circuit;
a first end of the second capacitor is connected to the first conductive line, and a second end of the second capacitor is connected to the gate electrode of the touch transistor; and
the resetting circuit comprises a resetting transistor, a gate electrode of which is the control end of the resetting circuit, a first electrode of which is the first end of the resetting circuit, and a second electrode of which is the second end of the resetting circuit.

6. The touch circuit according to claim 1, wherein the pressure sensitive circuit comprises a pressure sensitive transistor, a gate electrode of which is in a floating state, a first electrode of which is connected to the control end of the touch sub-circuit, and a second electrode of which is connected to the third voltage input end.

7. A touch driving method for the touch circuit according to claim 1, comprising:
at a touch scanning stage, controlling, by a touch sub-circuit, the voltage value of the voltage signal outputted to the third conductive line under the control of the control end of the touch sub-circuit, the voltage value being used to determine whether a touch electrode block connected to the control end of the touch sub-circuit is being touched, and enabling, by the resetting circuit, the third conductive line to be electrically disconnected from the second voltage input end under the control of the second conductive line; and
at a resetting stage, enabling, by the resetting circuit, the third conductive line to be electrically connected to the second voltage input end under the control of the second conductive line, so as to reset a voltage across the third conductive line.

8. The touch driving method according to claim 7, wherein the touch circuit further comprises a pressure sensitive circuit, and wherein the touch driving method further comprises;
at the touch scanning stage and the resetting stage, enabling, by the pressure sensitive circuit, the control end of the touch sub-circuit to be electrically connected to a third voltage input end when a pressure value of a pressure signal received by the pressure sensitive circuit is greater than a predetermined pressure value, and enabling, by the pressure sensitive circuit, the control end of the touch sub-circuit to be electrically disconnected from the third voltage input end when the pressure value of the pressure signal received by the touch sub-circuit is smaller than or equal to the predetermined pressure value.

9. The touch driving method according to claim 7, wherein the touch circuit further comprises a touch sensing circuit, and wherein the touch driving method further comprises:
at the touch scanning stage, determining, by the touch sensing circuit, whether the touch electrode block is being touched in accordance with the voltage value of the voltage signal on the third conductive line, and determining whether the pressure value of the pressure signal received by the pressure sensitive circuit is greater than the predetermined pressure value.

10. A touch display panel, comprising:
a gate metal layer arranged on a substrate and comprising a plurality of first conductive lines and a plurality of second conductive lines, the plurality of first conductive lines and the plurality of second conductive lines being arranged alternately; and
a touch circuit layer and a touch electrode layer arranged on the gate metal layer, the touch electrode layer comprising a plurality of touch electrode blocks arranged in rows and columns and separated from each other, the touch circuit layer comprising a plurality of third conductive lines and a plurality of the touch circuits according to claim 1 arranged in rows and columns.

11. The touch display panel according to claim 10, wherein a second insulation layer is arranged between the touch circuit layer and the gate metal layer, and a first insulation layer is arranged between the touch circuit layer and the touch electrode layer.

12. The touch display panel according to claim 11, wherein each touch circuit is electrically connected to one of the touch electrode blocks through a first via-hole penetrating through the first insulation layer, and electrically connected to one of the plurality of first conductive lines and one of the plurality of second conductive layers through a second via-hole and a third via-hole penetrating through the second insulation layer respectively.

13. The touch display panel according to claim 12, wherein the plurality of first conductive lines is a $(2N-1)^{th}$ gate line, the plurality of second conductive lines is a $(2N)^{th}$ gate line, the plurality of third conductive lines is a touch sensing line, and the plurality of first conductive line and the plurality of second conductive line are crossing the plurality of third conductive line;
each touch circuit in an $N^{th}$ row in the touch circuit layer is electrically connected to the $(2N-1)^{th}$ gate line and the $(2N)^{th}$ gate line in the gate metal layer through the second via-hole and the third via-hole respectively; and each touch circuit in an $M^{th}$ column in the touch circuit layer is electrically connected to an $M^{th}$ touch sensing line in the touch circuit layer, where N and M are each a positive integer.

14. The touch display panel according to claim 10, wherein the plurality of touch circuits in the touch circuit layer is arranged at a region corresponding to a non-opening region of the touch display panel.

15. The touch display panel according to claim 10, wherein a touch circuit in an $A^{th}$ row and a $B^{th}$ column in the touch circuit layer is arranged between a pixel circuit in a $(2A-1)^{th}$ row and a $(2B-1)^{th}$ column and a pixel circuit in the $(2A-1)^{th}$ row and a $(2B)^{th}$ column on the touch display panel, where A and B are each a positive integer.

16. A touch display panel, comprising:
   a gate metal layer arranged on a substrate and comprising a plurality of first conductive lines and a plurality of second conductive lines, the plurality of first conductive lines and the plurality of second conductive lines being arranged alternately; and
   a touch circuit layer and a touch electrode layer arranged on the gate metal layer, the touch electrode layer comprising a plurality of touch electrode blocks arranged in rows and columns and separated from each other, the touch circuit layer comprising a plurality of third conductive lines and a plurality of touch circuits arranged in rows and columns,
   wherein each touch circuit of the plurality of touch circuits comprises a touch sub-circuit, a first energy storage circuit, a second energy storage circuit, a resetting circuit, and a pressure sensitive circuit, wherein
   a first end of the first energy storage circuit is connected to a control end of the touch sub-circuit, and a second end of the first energy storage circuit is connected to a first voltage input end;
   a first end of the second energy storage circuit is connected to a first conductive line, and a second end of the second energy storage circuit is connected to the control end of the touch sub-circuit;
   a first end of the touch sub-circuit is connected to the first conductive line, and a second end of the touch sub-circuit is connected to a third conductive line;
   the touch sub-circuit is configured to control a voltage value of a voltage signal outputted to the third conductive line under the control of the control end of the touch sub-circuit;
   a control end of the resetting circuit is connected to a second conductive line, a first end of the resetting circuit is connected to the third conductive line, and a second end of the resetting circuit is connected to a second voltage input end; and
   the resetting circuit is configured to control the third conductive line to be electrically connected to, or electrically disconnected from, the second voltage input end under the control of the second conductive line,
   wherein a second insulation layer is arranged between the touch circuit layer and the gate metal layer, and a first insulation layer is arranged between the touch circuit layer and the touch electrode layer,
   wherein each touch circuit is electrically connected to one of the touch electrode blocks through a first via-hole penetrating through the first insulation layer, and electrically connected to one of the plurality of first conductive lines and one of the plurality of second conductive layers through a second via-hole and a third via-hole penetrating through the second insulation layer respectively.

\* \* \* \* \*